United States Patent
Dadiomov et al.

(10) Patent No.: US 6,775,708 B1
(45) Date of Patent: Aug. 10, 2004

(54) IDENTIFICATION OF TRANSACTIONAL BOUNDARIES

(75) Inventors: Alexander Dadiomov, Redmond, WA (US); Erez Haba, Atlit (IL); Raphael Renous, Haifa (IL)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/499,832

(22) Filed: Feb. 8, 2000

(51) Int. Cl.[7] .............................................. G06F 15/16
(52) U.S. Cl. ..................... 709/236; 709/230; 709/200
(58) Field of Search ............................... 709/231–237, 709/230, 202, 203; 370/474

(56) References Cited

U.S. PATENT DOCUMENTS

| | | | | | |
|---|---|---|---|---|---|
| 5,347,632 A | * | 9/1994 | Filepp et al. | ............... | 709/202 |
| 5,430,719 A | * | 7/1995 | Weisser, Jr. | ................ | 370/389 |
| 5,490,060 A | * | 2/1996 | Malec et al. | ................ | 705/10 |
| 5,680,324 A | * | 10/1997 | Schweitzer et al. | ......... | 709/224 |
| 5,781,912 A | * | 7/1998 | Demers et al. | ............. | 709/232 |
| 5,793,771 A | * | 8/1998 | Darland et al. | ............. | 370/467 |
| 5,806,075 A | * | 9/1998 | Jain et al. | .................... | 709/230 |
| 5,828,835 A | * | 10/1998 | Isfeld et al. | ................ | 709/200 |
| 5,881,247 A | * | 3/1999 | Dombrosky et al. | ........ | 709/232 |
| 6,044,081 A | * | 3/2000 | Bell et al. | ................... | 370/401 |
| 6,453,158 B2 | * | 9/2002 | Donovan et al. | ........... | 455/406 |

* cited by examiner

Primary Examiner—David Wiley
Assistant Examiner—Joseph E Avellino
(74) Attorney, Agent, or Firm—Leydig, Voit & Mayer Ltd.

(57) ABSTRACT

The identification of transactional boundaries among the messages sent and received within a transactional message system is disclosed. In one embodiment, a system includes a first computer and a second computer. The first computer is designed to set transactional boundaries among messages. The second computer is designed to determine the transactional boundaries thereamong—specifically such that it can determine whether at least a proper first and last message of a particular transaction has been received. In one embodiment, transactional boundaries are set among messages by tagging the first message of a transaction with a first-message identifier, and the last message with a last-message identifier. All the messages of the transaction can also be tagged with an identifier particular to the transaction.

31 Claims, 6 Drawing Sheets

IDENTIFICATION OF TRANSACTIONAL BOUNDARIES

FIELD OF THE INVENTION

This invention relates generally to transactional message systems, and more particularly to the identification of transactional boundaries among messages of transactions sent and received within such systems.

BACKGROUND OF THE INVENTION

When organizations need to have large-scale computer systems that hold mission critical information, such as purchase orders, financial information, etc., they usually resort to message transaction systems. Message transaction systems ensure that data is not lost if the system crashes, and also that data is not duplicated—such as ensuring that two copies of the same purchase order are not processed, etc. A transaction is an activity or a request, such as an order, a purchase, a change, or an addition to a database of information. Transactions usually update one or more files on a non-volatile storage such as a hard disk drive, and thus can serve as both an audit trail and a history for future analyses. A transaction can include one or more messages. A transaction is considered committed when all the messages of the transaction have been received and processed.

Message transaction systems can be online or offline. Online, or synchronous, systems are also referred to as real-time systems, where transactions are processed and the appropriate files updated as soon as transactions are entered or received. Typically, confirmations are then returned to the sender. Thus, for online systems, usually a single message transaction is processed at a time. Offline, or a synchronous, systems, by comparison, do not process transactions as soon as they are entered or received. Rather, a number of message transactions are processed as a batch—for example, at the end of the business day, once a week, etc.

Because a number of transactions may be sent to a given receiver, where each of those transactions can include a number of messages, the receiver must be able to determine which messages belong to which transactions. This task is made more difficult because the messages may be transmitted over a network such as wide-area network (WAN) or the Internet that is vulnerable to losing messages, such that the receiver does not receive one or more messages of a given transaction. The receiver may not receive messages for other reasons as well, including incorrect encryption, failed authentication, insufficient permissions, and time-out occurrences, as can be appreciated by those within the art. For this and other reasons, therefore, there is a need for the present invention.

SUMMARY OF THE INVENTION

The present invention relates to the identification of transactional boundaries among the messages sent and received within a transactional message system. In one embodiment, there is a system including a first computer and a second computer. The first computer is designed to at least set transactional boundaries among messages, and transmit the messages. The second computer is designed to at least receive the messages, and determine the transactional boundaries thereamong—specifically such that the second computer can determine whether at least a proper first and last message of a particular transaction has been received. In one embodiment, transactional boundaries are set among messages by tagging the first message of a transaction with a first-message identifier, and the last message with a last-message identifier. Furthermore, all the messages of the transaction can be tagged with an identifier particular to the transaction.

Embodiments of the invention provide for advantages not found within the prior art. A receiver computer, for example, if, after receiving the first message of a first transaction as has been tagged, receives another message tagged with the first-message identifier, then the computer knows that one or more messages of the first transaction has been lost—since the last message of the first transaction has not been received. Thus, the computer knows that this transaction cannot be committed, since at least one of the messages of the transaction has not been received. Sender-side transactions are therefore correlated with receiver-side transactions.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
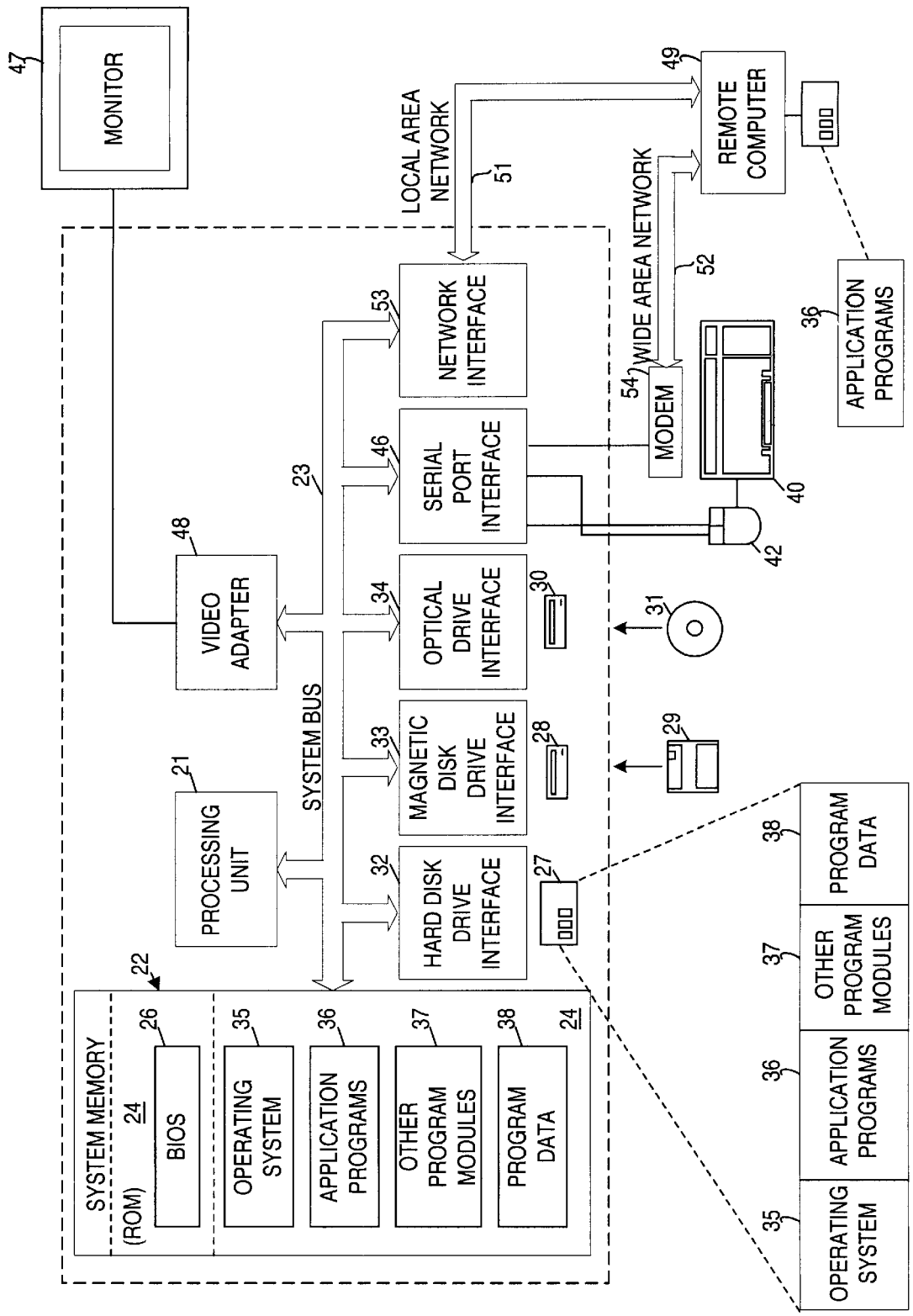
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Overview of a Transactional Message System

Figure 2:
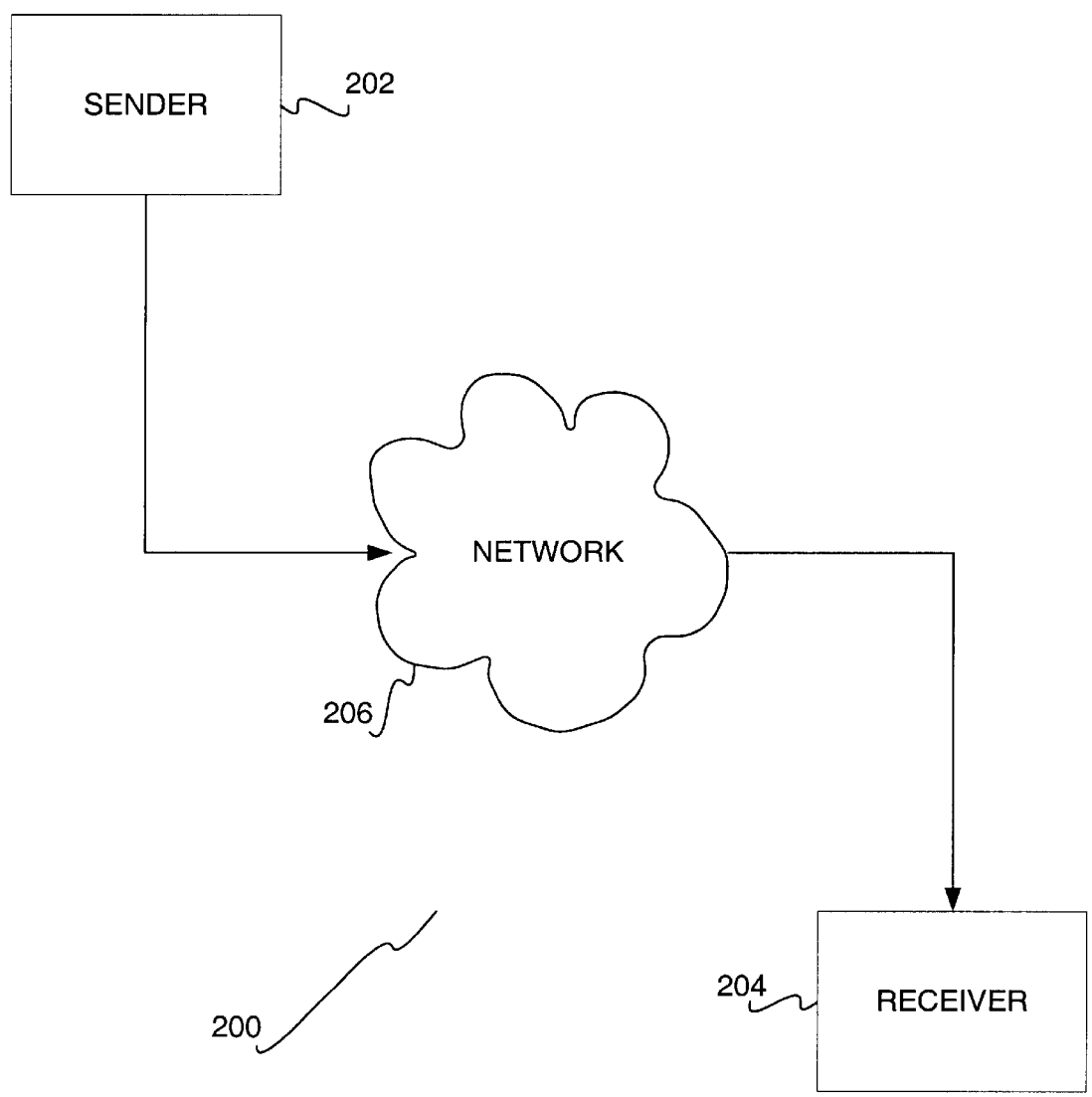
FIG. 2 is a diagram showing a transactional message system according to an embodiment of the invention.

An overview of a transactional message system according to an embodiment of the invention is described in this section of the detailed description, in conjunction with the diagram of FIG. 2, which is a diagram of such a system. The system can be either a synchronous system or an a synchronous system in varying embodiments. The system 200 of FIG. 2 includes a sender 202, a receiver 204, and a network 206. Each of the sender 202 and the receiver 204 can in one embodiment be a computer, such as that which has been described in the previous section of the detailed description, in conjunction with FIG. 1, although the invention is not so limited. Each of the sender and the receiver 204 desirably includes a communications device, such as a network card, a router, etc., so that it is able to communicate over the network 206. The network 206 can be a public network, such as the Internet, or a private network, such as an intranet or a wide-area network (WAN), or a combination public-private network, such as the public Internet connected to an intranet or an extranet. The invention is not so particularly limited.

The sender 202 sends (transmits) one or more messages that make up a transaction. These messages are sent over the network 206. The receiver 204 receives the messages as sent over the network 206. Assuming that all the messages that make up the transaction have been received by the receiver 204, it is said that the transaction is committed when all the messages have been processed thereby. If, however, one or more of the messages are lost, and/or the receiver 204 crashes or otherwise fails prior to processing all the messages, then the transaction is not committed. Embodiments of the invention are concerned with identifying the boundaries of transactions among the messages sent and received within such a transactional system.

The sender 202 thus includes a computer program designed to set transactional boundaries among messages, so that the receiver 204 is able to determine whether it has received at least a proper first and last message of a transaction. The program of the sender 202 can be considered the means for performing this functionality in one embodiment. Likewise, the receiver 204 includes a computer program designed to determine the transactional boundaries among the messages, such that it is able to determine whether at least a proper first and last message of a transaction have been received. The program of the receiver 204 can be considered the means for performing this functionality in one embodiment. In each of the receiver 204 and the sender 202, its program can be executed by a processor from a computer-readable medium such as a memory or a hard drive, in one embodiment.

Transactional Boundaries Among Messages

Figure 3:
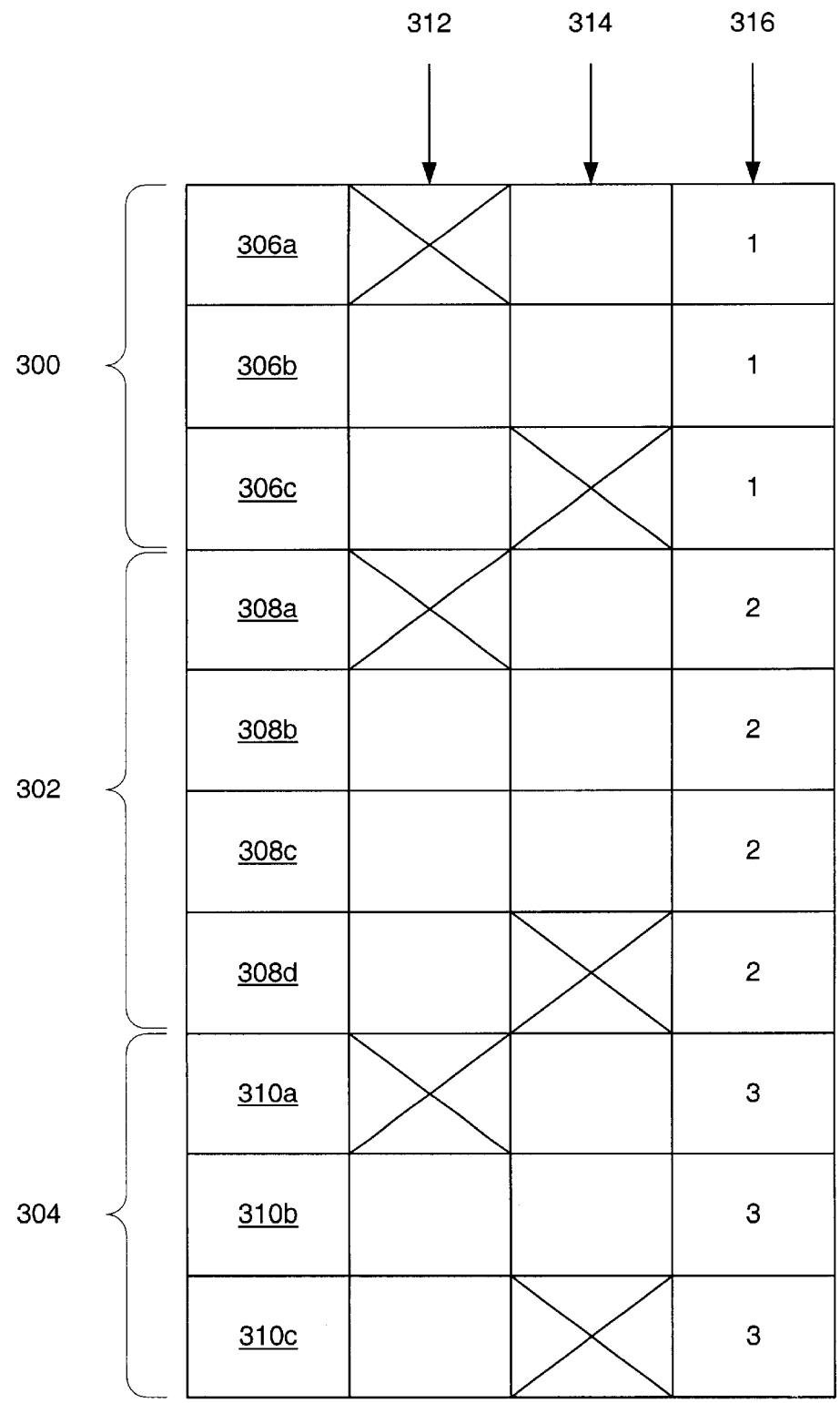
FIG. 3 is a diagram of a tagging methodology for transactional messages according to one embodiment of the invention.

In this section of the detailed description, the manner by which transactional boundaries among messages are set in accordance with one embodiment of the invention is described, in conjunction with reference to FIG. 3. The diagram of FIG. 3 shows transactions 300, 302 and 304. The transaction 300 includes messages 306*a*, 306*b* and 306; the transaction 302 includes messages 306*a*, 306*b*, 306*c* and 306*d*; and, the transaction 304 includes messages 310*a*, 310*b* and 310*c*. The invention is not limited to a particular number of transactions, nor a particular number of messages that make up any such transaction, as can be appreciated by those of ordinary skill within the art. The number of transactions and the number of messages that make up those transactions as shown in FIG. 3 is an example for illustrative and descriptive purposes only.

To identify transactional boundaries, each message within each transaction is taggable with one or more of three tags: a first-message identifier, as represented by column 312; a last-message identifier, as represented by column 314, and a transaction-counter identifier, as represented by column 316. The first-message identifier, when a message is so tagged therewith, signifies that the message is the first message within a transaction. The last-message identifier, when a message is so tagged therewith, signifies that the message is the last message within a transaction. Finally, in one embodiment, all the messages within a given transaction are tagged the same value of the transaction-counter identifier, to signify that they are all part of the same transaction.

Each of the first-message identifier and the last-message identifier, as represented by columns 312 and 314, respectively, can in one embodiment be a single bit, such that the bit is set to one to indicate that a given message is tagged with the identifier, and set to zero (by default) to indicate that a given message is not tagged with the identifier. In one embodiment, the transaction-counter identifier, as represented by the column 316, can include an ordered rolling counter of bits. For example, a four-bit counter can distinguish among $2^4=16$ different transactions. Thus, the counter having the binary value 0000 may signify a first transaction, the counter having the binary value 0001 may signify a second transaction, et seq.

As shown in FIG. 3, tagging by the first- or last-message identifier is denoted as an X in the column corresponding to that identifier, for a particular message, while tagging a particular value of the transaction-counter identifier is shown as a number (e.g., 1, 2, 3), where all the messages having the same number value for this identifier are part of the same transaction. Thus, the message 306*a* of the transaction 300 is tagged with the first-message identifier because it is the first message of the transaction 300, while the message 306*c* is tagged with the last-message identifier because it is the last message of the transaction 300. All the messages 306*a*, 306*b* and 306*c* of the transaction 300 are tagged with the same value of the transaction-counter identifier, such as binary 0001=1 as shown in FIG. 3, because all the messages are part of the same transaction.

Similarly, as shown in FIG. 3, the message 306*a* of the transaction 302 is tagged with the first-message identifier because it is the first message of the transaction 302, while the message 306*d* is tagged with the last-message identifier because it is the last message of the transaction 302. All the messages 306*a*, 306*b*, 306*c* and 306*d* of the transaction 302 are tagged with the same value of the transaction-counter identifier, such as binary 0010=2, because all the messages are part of the same transaction. Likewise, as shown in FIG. 3, the message 310*a* of the transaction 304 is tagged with the first-message identifier because it is the first message of the transaction 304, while the message 310*c* is tagged with the last-message identifier because it is the last message of the transaction 304. All the messages 310*a*, 310*b*, 310*c* and 310*d* of the transaction 304 are tagged with the same value of the transaction-counter identifier, such as binary 0011=3, because all the messages are part of the same transaction.

State Machine

In this section of the detailed description, a state machine according to an embodiment of the invention is described. A state machine generally is a logical mechanism designed with the operational states required to solve a specific problem. In the context of this embodiment of the invention, the state machine is utilized to determine whether either the first or the last message of a transaction has been lost after having been sent. The state machine as described in this section utilizes the transactional boundary identification methodology described in the previous section of the detailed description, although it is noted that the state machine does not utilize the transaction-counter identifier described in the previous section. The state machine can be utilized in conjunction with systems, methods, computers, and machine-readable media embodiments of the invention—for example, by a receiver computer that upon receiving messages in a message queue, must determine whether any of the first or last messages of any transaction has not been properly received in the message queue.

Figure 4:
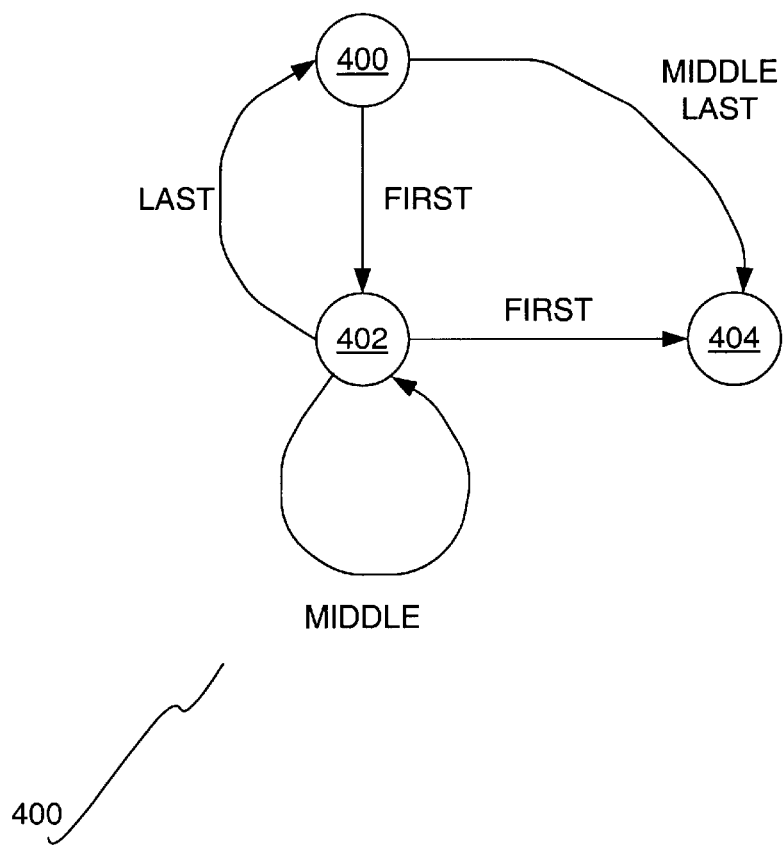
FIG. 4 is a state machine in accordance with an embodiment of the invention.

Referring now to FIG. 4, a diagram of a state machine according to an embodiment of the invention is shown. The state machine starts in the state 400, signifying that the machine is in-between transactions. Upon receiving a message tagged with the first-message identifier, the machine proceeds to the state 402. However, if the state machine receives a message that is tagged with a last-message identifier, or not tagged with either the first- or the last-message identifier (signifying a "middle" message of a transaction—i.e., a message that is neither the first nor the last message of a transaction), signifying that the first message of a transaction has not been properly received, then the state machine instead proceeds to the state 404. The state 404 corresponds generally to an error state, such that a proper first and/or last message of a transaction has not been received. The state machine terminates at the state 404.

However, if the state machine did proceed from the state 400 to the state 402, then from the state 402, one of three events can occur. If a message tagged with a first-message identifier has been received, this signifies that the last message of the current transaction has not been properly received, and the state machine proceeds to the state 404, corresponding to the error state, as has been described. If a message tagged with a last-message identifier has been received, this signifies the end of the current transaction, such that both the last and the first message of the transaction have been properly received, and the state machine returns to the in-between transactions state 400, where it awaits receipt of another message. Finally, if a message is received that is tagged neither with a last- nor a first-message identifier, then this means that the message received is a middle message of the transaction—i.e., a message that is neither the first nor the last message of the transaction. Therefore, the state machine remains at the state 402.

Methods

In this section, methods of varying embodiments of the invention are described. Such methods can be performed by and in conjunction with the methodologies, state machines, systems and computers described in preceding sections of the detailed description. However, the invention is not so limited. In some embodiments, the methods are computer-implemented. The computer-implemented methods can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer.

Figure 5:
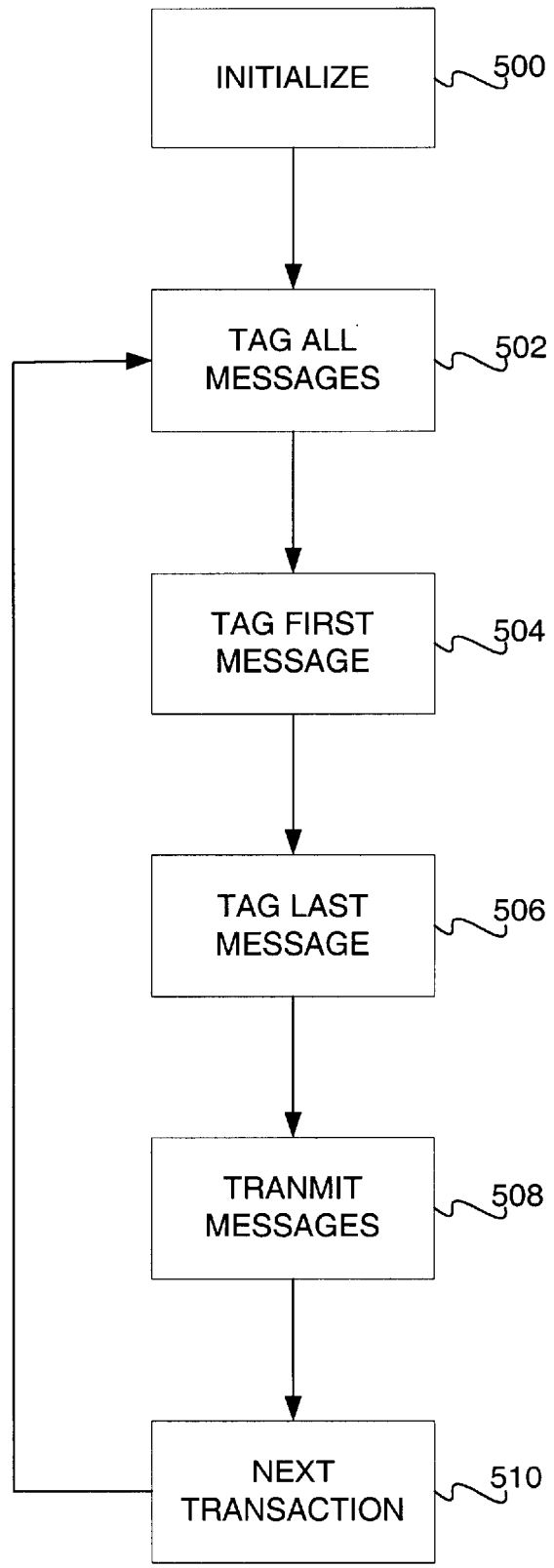
FIG. 5 is a flowchart of a method according to an embodiment of the invention; and, FIG. 6 is a flowchart of a method according to another embodiment of the invention.

Referring to FIG. 5, a flowchart of a method according to an embodiment is shown. The method is desirably performed by a sender within a transactional message system, such as a server or other sender computer. In 500, initialization occurs, including setting a transaction-counter identifier to zero, to signify a first transaction, for example. In 502, all the messages within the current transaction are tagged with the same value for the transaction-counter identifier. In 504, the first message within the current transaction is tagged with a first-message identifier, while in 506, the last message within the current transaction is tagged with a last-message identifier. Finally, all the messages within the current transaction are transmitted in 508. It is noted that the order of performance of 504, 506 and 508 is not limited by the invention. Furthermore, messages may be tagged with the transaction-counter identifier, and either or none of the first- and last-message identifiers as appropriate, and then transmitted on a per-message basis. In 510, the method proceeds to the next transaction, such that the transaction-counter identifier is incremented. The method then repeats at 502 for this new current transaction. Thus, the method can continue with a second transaction, a third transaction, et seq.

Figure 6:
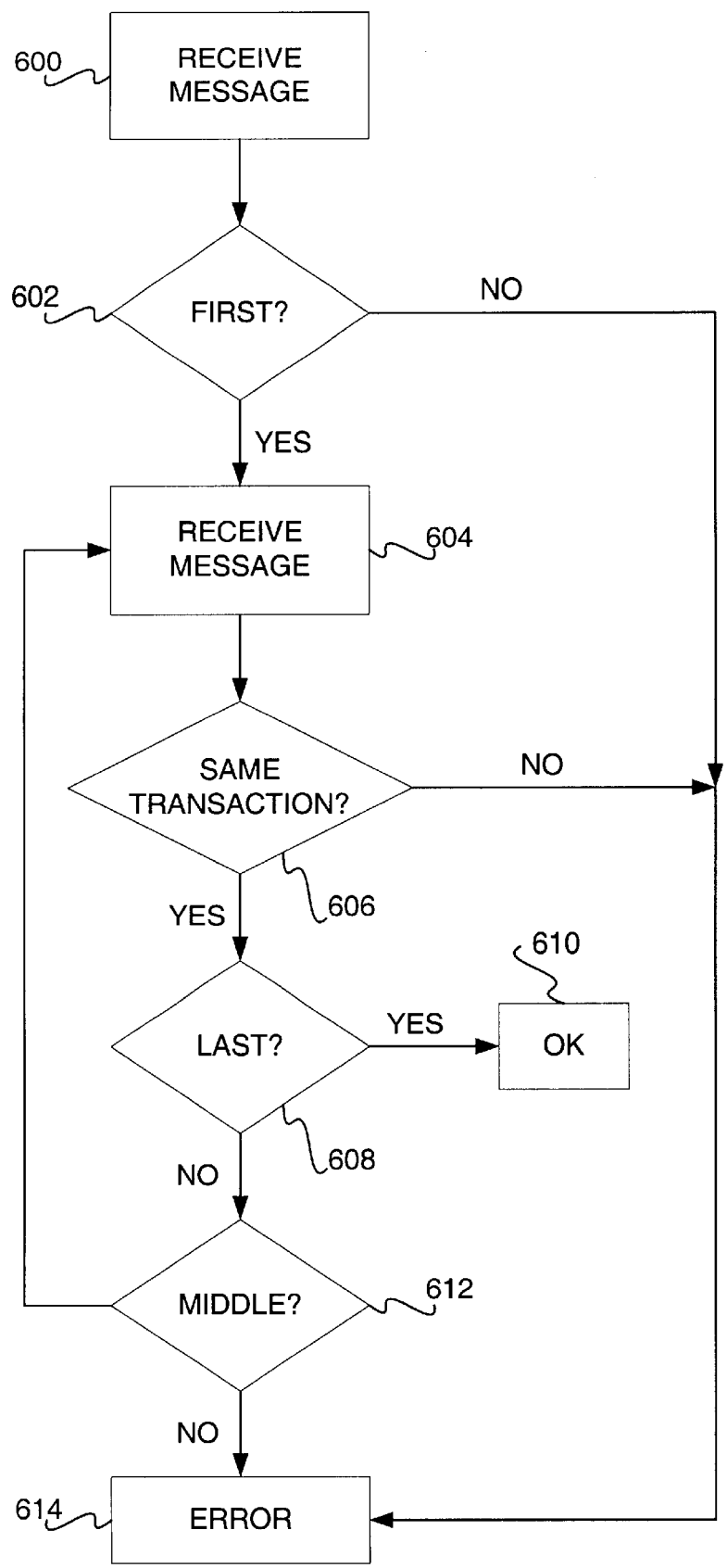

Referring next to FIG. 6, a flowchart of a method according to another embodiment of the invention is shown. This method is desirably performed by a receiver within a transactional message system, such as a client or other receiver computer. In 600, a message is received. In 602, it is determined whether this message is tagged with a first-message identifier. If not, then an error has occurred—that is, the first message of a transaction has not been properly received—and the method proceeds to and ends at 614. Otherwise, the method proceeds from 602 to 604, where a next message is received. If this message is not tagged with a transaction-counter identifier having the same value as that which the first message received in 600 is tagged, then an error has occurred—that is, the message received most recently in 604 is part of a different transaction than that received in 600—and the method proceeds to and ends at 614.

Otherwise, the method proceeds from 606 to 608, where it is determined whether the message most recently received in 604 is tagged with a last-message identifier. If so, then the method proceeds to 610, where the method is properly finished—since it has received both a proper first and a proper last message of a particular transaction. Otherwise, the method proceeds from 608 to 612, where it is determined whether the message most recently received in 604 is tagged with the first-message identifier. If so, then an error has occurred—that is, the first message of the transaction has been re; received, both first in 600, and then in 604—and the method proceeds to and ends at 614. Otherwise, this signifies that the message most recently received in 604 is a middle message of the current transaction—neither the first message nor the last message thereof—such that the method proceeds back to 604, to receive another message.

Thus, the method of FIG. 5 provides for a sender uniquely tagging a first message of a transaction and uniquely tagging a last message of a transaction—and tagging each message of the transaction as part of the transaction. The method of FIG. 6 provides for a receiver determining whether the first message of the transaction and the last message thereof as have been uniquely tagged have been received—and determining whether each message received after the first message of the transaction is tagged as part of the same transaction as the first message—such that it is able to conclude at least that a transaction having a proper first and last message has been received. In so doing, the methods of FIGS. 5 and 6 provide for the identification of transactional boundaries among messages.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A machine-readable medium having instructions stored thereon for execution by a processor of a sender within a message transaction system within a network to perform a method comprising:

tagging a first message of a transaction with a first-message identifier and a transaction-counter identifier;

tagging a last message of the transaction with a last-message identifier and the transaction-counter identifier;

tagging any other message of the transaction with the transaction-counter identifier;

transmitting the first message of the last message, and the any other message of the transaction; and, wherein the any other message of the transaction is not sequentially tagged.

2. The medium of claim 1, the method further comprising:

changing the transaction-counter identifier;

tagging a first message of a second transaction with the first-message identifier and the transaction-counter identifier as changed;

tagging a last message of the second transaction with the last-message identifier and the transaction-counter identifier as changed;

tagging any other message of the second transaction with the transaction-counter identifier as changed; and, transmitting the first message, the last message, and the any other message of the second transaction.

3. The medium of claim 2, wherein the transaction-counter identifier comprises an ordered counter of bits, and changing the transaction-counter identifier comprises incrementing the ordered counter of bits.

4. The medium of claim 1, wherein the first-message identifier comprises a bit set to one when tagged and otherwise set to zero.

5. The medium of claim 1, wherein the last-message identifier comprises a bit set to one when tagged and otherwise set to zero.

6. The medium of claim 1, wherein the transaction-counter identifier comprises an ordered counter of bits.

7. A machine-readable medium having instructions stored thereon for execution by a processor of a sender within a message transaction system within a network to perform a method comprising:

tagging a first message of a transaction with a first-message identifier;

tagging a last message of the transaction with a last-message identifier;

transmitting the first message, the last message, an any other message of the transaction; and, wherein the any other message of the transaction is not sequentially tagged.

8. The medium of claim 7, wherein the first-message identifier comprises a bit set to one when tagged and otherwise set to zero.

9. The medium of claim 7, wherein the last-message identifier comprises a bit set to one when tagged and otherwise set to zero.

10. The medium of claim 7, the method further comprising, prior to transmitting, tagging the first message, the last message, and the any other message of the transaction with a transaction-counter identifier.

11. The medium of claim 10, wherein the transaction-counter identifier comprises an ordered-counter of bits.

12. A machine-readable medium having instructions stored thereon for execution by a processor of a receiver within a message transaction system within a network to perform a method comprising;

receiving a first message;

determining whether the first message is tagged with a first-message identifier;

upon determining that the first message is tagged with the first-message identifier, repeating receiving an additional message until the additional message received is tagged with one of the first-message identifier and a last-message identifier;

upon determining that the additional message is tagged with the last-message identifier, concluding at least that a transaction having a proper first and last message has been received;

otherwise concluding that an error has occurred;

otherwise concluding that an error has occurred; and, wherein any other message of the transaction is not sequentially tagged.

13. The medium of claim 12, wherein repeating receiving an additional message until the additional message received is tagged with one of the first-message identifier and a last-message identifier comprises repeating receiving the additional message until the additional message received is tagged with one of the first-message identifier, the last-message identifier and a transaction-counter identifier unequal to a transaction-counter identifier with which the first message is tagged.

14. The medium of claim 13, wherein upon determining that the additional message is tagged with the last-message identifier; concluding at least that a transaction having a proper first and last message has been received comprises upon determining that the additional message is tagged with the last-message identifier and with a transaction-counter identifier equal to a transaction-counter identifier with which the first message is tagged, concluding at least that a transaction having a proper first and last message has been received only upon so determining.

15. The medium of claim 12, wherein the first-message identifier comprises a bit set to one when tagged and otherwise set to zero.

16. The medium of claim 12, wherein the last-message identifier comprises a bit set to one when tagged and otherwise set to zero.

17. A machine-readable medium having instructions stored thereon for execution by a processor of a receiver within a message transaction system within a network to perform a method comprising;

receiving a first message;

determining whether the first message is tagged with a first-message identifier;

upon determining that the first message is tagged with the first-message identifier, repeating receiving an additional message until the additional message received is tagged with one of the first message identifier, a last-message identifier, and an transaction-counter identifier unequal to a transaction-counter identifier with which the first message is tagged;

upon determining that the additional message is tagged with the last-message identifier and with a transaction-counter identifier equal to a transaction-counter identifier with which the first message is tagged, concluding at least that a transaction having a proper first and last message has been received;

otherwise concluding that an error has occurred;

otherwise concluding that an error has occurred; and, wherein any other message of the transaction is not sequentially tagged.

18. The medium of claim 17, wherein the transaction-counter identifier comprises an ordered counter of bits.

19. The medium of claim 17, wherein the first-message identifier comprises a bit set to one when tagged and otherwise set to zero.

20. The medium of claim 17, wherein the last-message identifier comprises a bit set to one when tagged and otherwise set to zero.

21. A computer-implemented method for performance within an transaction message system within a network comprising;
  at a sender, for a transaction comprising an ordered plurality of messages, tagging a first message of the transaction with a first-message identifier and tagged a last message of the transaction with a last-message identifier;
  transmitting the messages of the transaction from the sender to a receiver;
  at the receiver, determining whether the tagged first message of the transaction and the tagged last message of the transaction have been received, and upon so determining, concluding at least that a transaction having a proper first and last message has been received; and,
  wherein any other message of the transaction is not sequentially tagged.

22. The method of claim 21, further initially comprising, at the sender, tagging each message of the transaction as part of the transaction.

23. The method of claim 22, further comprising, at the received, determining whether each message received after the first message of the transaction is tagged as part of the transaction, until the tagged last message of the transaction has been received, and concluding at least that a transaction having a proper first and last message has been received only upon so determining.

24. A sender computer of a message transaction system within a network comprising:
  a communication device;
  a computer program designed to set transactional boundaries among messages, such that a receiver computer is able to determine whether at least a proper first and last message of a transaction have been received, and to transmit the messages via the communications device; and,
  wherein any other message of the transaction is not sequentially tagged.

25. The sender computer of claim 24, further comprising a processor and a computer-readable medium, such that the computer program is executed by the processor from the computer-readable medium.

26. A sender computer of a message transaction system within a network comprising:
  a communication devices:
  means for setting transactional boundaries among messages, such that a receiver computer is able to determine whether at least a proper first and last message of a transaction have been received, and for transmitting, the message via the communications device; and,
  wherein any other message of the transaction is not sequentially tagged.

27. A receiver computer of a message transaction system within a network comprising:
  a communications device;
  a computer program designed to receive messages via the communications device, and to determine transactional boundaries among the messages, such that the program is able to determine whether at least a proper first and last message of a transaction have been received; and,
  wherein any other message of the transaction is not sequentially tagged.

28. The received computer of claim 27, further comprising a processor and a computer-readable medium, such that the computer program is executed by the processor from the computer-readable medium.

29. A receiver
  computer of a message transaction system within a network comprising:
  a communications device;
  means for receiving messages via the communications device, and for determining transactional boundaries among the messages, such that the means is able to determine whether at least a proper first and last message of a transaction have been received; and,
  wherein any other message of the transaction is not sequentially tagged.

30. A computerized message transaction system within a network comprising:
  a first computer designed to at least set transactional boundaries among messages, and to transmit the messages;
  a second computer designed to at least receive the messages, and to determine the transactional boundaries among the messages, such that the second computer is able to determine whether at least a proper first and last message of a particular transaction have been received; and,
  wherein any other message of the transaction is not sequentially tagged.

31. A computerized message transaction system within a network comprising:
  means for setting transactional boundaries among messages and transmitting the message;
  means for receiving the messages, and for determining the transactional boundaries among the messages, such that the means is able to determine whether at least a proper first and last message of a particular transaction have been received; and,
  wherein any other message of the transaction is not sequentially tagged.

* * * * *

UNITED STATES PATENT AND TRADEMARK OFFICE
CERTIFICATE OF CORRECTION

PATENT NO. : 6,775,708 B1
DATED : August 10, 2004
INVENTOR(S) : Alexander Dadiomov It is certified that error appears in the above-identified patent and that said Letters Patent is hereby corrected as shown below:

Column 6,
Line 1, delete "306" and insert -- 306c --.
Line 2, delete "306a" and insert -- 308a --.
Line 2, delete "306b" and insert -- 308b --.
Line 2, delete "306c" and insert -- 308c --.
Line 3, delete "306d" and insert -- 308d --.
Line 51, delete "306a" and insert -- 308a --.
Line 54, delete "306d" and insert -- 308d --.
Line 56, delete "306a" and insert -- 308a --.
Line 56, delete "306b" and insert -- 308b --.
Line 56, delete "306c" and insert -- 308c --.
Line 56, delete "306d" and insert -- 308d --.

Column 11,
Line 35, delete "tagged" and insert -- tagging --.
Line 51, delete "received" and insert -- receiver --.

Signed and Sealed this

Twenty-seventh Day of September, 2005

JON W. DUDAS
*Director of the United States Patent and Trademark Office*

(12) EX PARTE REEXAMINATION CERTIFICATE (6038th)

United States Patent
Dadiomov et al.

(10) Number: US 6,775,708 C1
(45) Certificate Issued: Dec. 4, 2007

(54) IDENTIFICATION OF TRANSACTIONAL BOUNDARIES

(75) Inventors: Alexander Dadiomov, Redmond, WA (US); Erez Haba, Atlit, IL (US); Raphael Renous, Haifa, IL (US)

(73) Assignee: Microsoft Corporation, Redmond, WA (US)

Reexamination Request:
No. 90/007,655, Aug. 4, 2005

Reexamination Certificate for:
Patent No.: 6,775,708
Issued: Aug. 10, 2004
Appl. No.: 09/499,832
Filed: Feb. 8, 2000

Certificate of Correction issued Sep. 27, 2005.

(51) Int. Cl.
*G06F 15/16* (2006.01)

(52) U.S. Cl. .................. 709/236; 709/200; 709/230
(58) Field of Classification Search .............. 709/236, 709/200, 230
See application file for complete search history.

(56) References Cited

U.S. PATENT DOCUMENTS

| 4,264,782 A | 4/1981 | Konheim |
| 4,302,810 A | 11/1981 | Bouricius |
| 5,604,802 A | 2/1997 | Holloway |
| 6,330,582 B1 | 12/2001 | Kuo |

*Primary Examiner*—Charles R. Craver

(57) ABSTRACT

The identification of transactional boundaries among the messages sent and received within a transactional message system is disclosed. In one embodiment, a system includes a first computer and a second computer. The first computer is designed to set transactional boundaries among messages. The second computer is designed to determine the transactional boundaries thereamong—specifically such that it can determine whether at least a proper first and last message of a particular transaction has been received. In one embodiment, transactional boundaries are set among messages by tagging the first message of a transaction with a first-message identifier, and the last message with a last-message identifier. All the messages of the transaction can also be tagged with an identifier particular to the transaction.

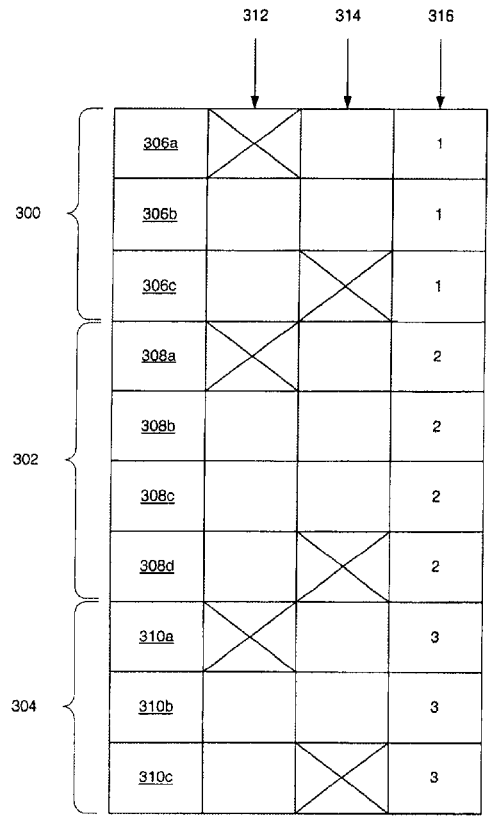

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–31 is confirmed.

* * * * *